Aug. 9, 1932.  E. D. JOHNSON  1,870,289

HYDRAULIC BRAKE MECHANISM

Filed May 22, 1930

Inventor
E. D. Johnson
By *E. G. Huffman*
Att'y.

Patented Aug. 9, 1932

1,870,289

UNITED STATES PATENT OFFICE

EDWARD D. JOHNSON, OF ST. LOUIS, MISSOURI, ASSIGNOR TO WAGNER ELECTRIC CORPORATION, OF ST. LOUIS, MISSOURI, A CORPORATION OF DELAWARE

HYDRAULIC BRAKE MECHANISM

Application filed May 22, 1930. Serial No. 454,615.

My invention relates to hydaulic brake mechanism, one of its objects being to produce a mechanism of this type which will be readily applicable to the landing gear of airplanes.

A further object of my invention is to provide for ready access to the brake mechanism, permitting adjustment of the working parts, relining the brake shoes, or the like.

Figure 1:
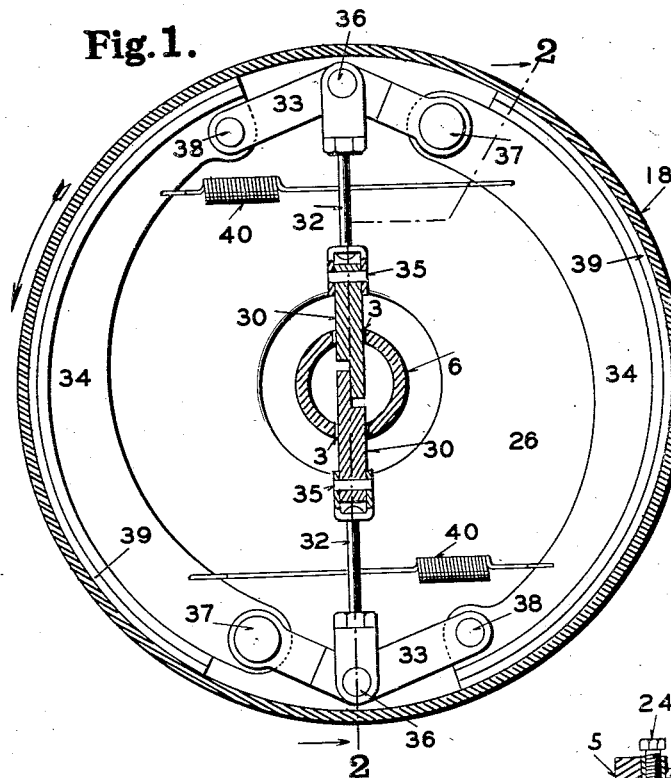
Figure 2:
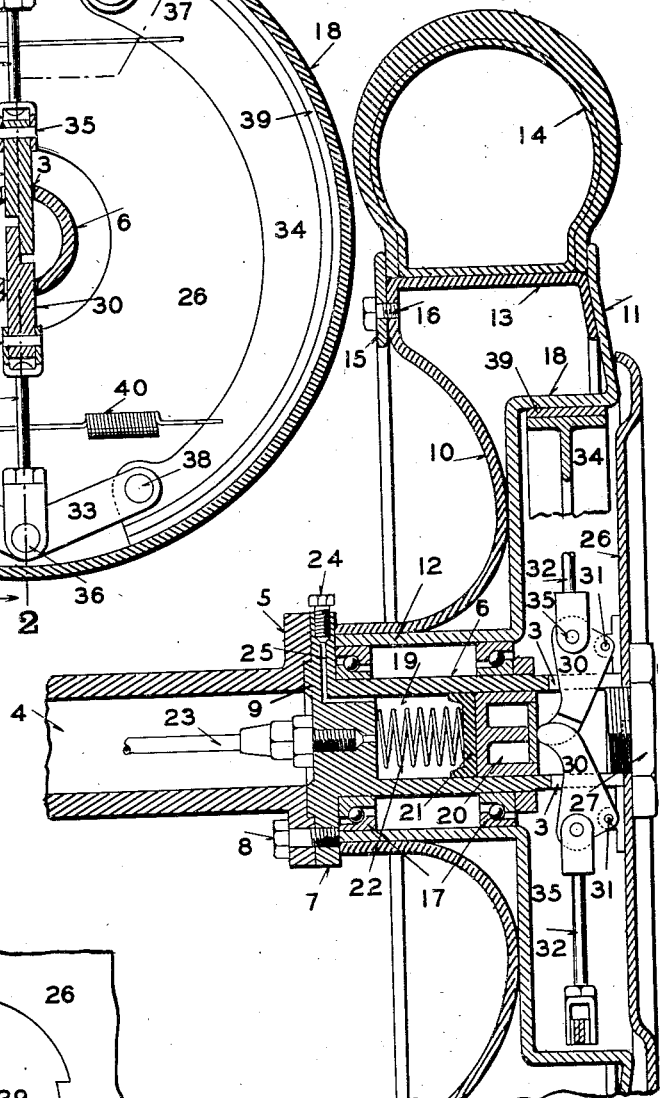
Figure 3:
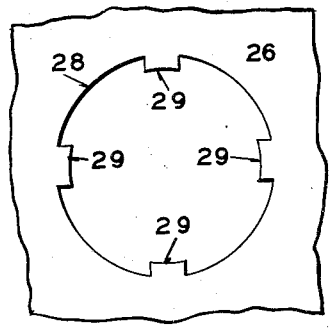

In the accompanying drawing, which illustrates one form of brake mechanism made in accordance with my invention, Figure 1 is a vertical cross section through the brake drum; Figure 2 is a section through the wheel and axle, taken in the direction indicated by the line 2—2 of Figure 1; and Figure 3 is a detail view showing the form of the spindle engaging opening in the shield.

Referring first to Figure 2, 4 indicates an axle of the landing gear of an airplane, which axle is provided on its end with a recessed flange 5. 6 is a spindle provided with a flange 7 secured to the flange 5 by bolts 8 and located concentrically with respect to the axle by means of a centering boss 9 extending into the recess of the flange 5. The wheel is formed of a rear disk member 10 and a front disk member 11, shaped as shown and welded or otherwise secured together to provide a wheel disk having an integral hub 12 and rim 13. The tire 14 is detachably secured to the rim by an annulus 15 attached to the disk 10 by screws 16. Interposed between the hub and spindle is an anti-friction bearing 17, preferably of the ball type. Formed in the disk 11 is an integral brake drum 18.

Spindle 6 is provided with a bore 19 to form the working cylinder of the brake which cylinder contains a piston 20 provided with the usual sealing cup 21 and spring 22. Fluid pressure for operating the piston is supplied through a flexible tube 23 extending through the axle to a suitable source of fluid pressure. In order to allow the escape of air from the cylinder chamber when the operating fluid is introduced into the braking system, said chamber communicates with the atmosphere through a passage 25 controlled by bleeder valve 24.

A shield 26 of sufficient size to cover the brake drum is secured to the spindle by means of a short bolt 27 having threaded engagement with the bore of the spindle. The spindle opening 28 in the shield is provided with projections 29, preferably four in number, which engage with corresponding slots in the end of the spindle, thus effectively preventing relative rotary movement between the spindle and the shield. Two of these slots are extended backward into the spindle to provide passages 3 for a pair of bell-crank levers 30 pivoted at 31 to brackets carried on the shield. A pair of rods 32 connect the levers with toggles 33 for actuating the brake shoes 34. One end of each rod is pivoted at 35 to one of the levers and the other at 36 to the toggle. One end of each toggle turns on a pin 37 carried by the shield and forming the pivot of one of the brake shoes, the other end being pivoted at 38 to the free end of the other shoe. This construction, securing the maximum braking effect of both shoes, is permissible owing to the fact that in airplanes the brakes are only required while the plane is moving forward and the drum rotating in the direction indicated by the arrow in Figure 1. 39 indicates the brake lining and 40 the springs for retracting the brake shoes after their application.

In the operation of the brake, when fluid under pressure is admitted to the cylinder 19 through pipe 23 the piston 20 is forced against the ends of the bell-crank levers rocking them on pivots 31 and through the rods 32 drawing the pivots 36 toward the center of the wheel. This causes the toggles to simultaneously apply both brake shoes to secure maximum braking effect. Upon release of the fluid pressure the springs 40 retract the shoes.

By utilizing the hollow spindle to contain the working cylinder and a portion of the wheel disk to form the brake drum, a construction is secured having at the same time light weight and great strength and rigidity. Furthermore, removal of the shield, carrying the brake shoes and their operating connections, gives ready access to both the brake and working cylinder for repairs or adjustment. Another advantage of my construction is that it may be applied to any type of landing gear by providing the ends of the axle with recessed flanges of the proper dimensions.

Having fully described my invention, what I claim as new and desire to secure by Letters Patent of the United States is:

1. In a device of the class described, the combination with a hollow wheel spindle, of a piston within and movable longitudinally of said spindle, a wheel mounted on said spindle and provided with a brake drum, a brake shoe for said drum movable in a plane transverse to the spindle, and operating connections between said piston and brake shoe.

2. In a device of the class described, the combination with a hollow spindle, of a piston in said spindle, a wheel mounted rotatively on said spindle and provided with a brake drum, a brake shoe for said drum, and operating connections including a bell-crank lever between said piston and brake shoe.

3. In a device of the class described, the combination with a hollow wheel spindle, of a piston in said spindle, a wheel having a hub embracing said spindle, said wheel also comprising a disk member shaped to form a brake drum, a brake shoe for said drum, and operating connections between said piston and brake shoe.

4. In a device of the class described, the combination with a hollow wheel spindle, of a piston in said spindle, a wheel having a hub embracing said spindle and provided with a brake drum, a shield for said drum mounted on the outer end of said spindle, and a brake shoe and operating connections therefor mounted on said shield, said connections being actuated by said piston.

5. In a device of the class described, the combination with a hollow spindle, of a piston in said spindle, a wheel mounted on said spindle and having a disk member shaped to form a brake drum, a shield for said drum, a brake shoe mounted on said shield, a bell-crank lever also mounted on said shield and bearing on said piston, and connections between said bell-crank lever and brake shoe.

6. In a device of the class described, the combination with a hollow spindle, of a piston in said spindle, a wheel mounted on said spindle, said wheel comprising front and rear disk members forming a hub and tire tread, a brake drum integral with said front disk member, a shield for said drum carried by said spindle, a pair of brake shoes pivoted on said shield, a toggle extending between the pivot of each shoe and the free end of the other shoe, a pair of bell-crank levers carried by said shield and bearing on said piston, and connections between said bell-crank levers and said toggles.

In testimony whereof, I hereunto affix my signature, this 17th day of May, 1930.

EDWARD D. JOHNSON.